(12) United States Patent
Kuba

(10) Patent No.: US 7,369,875 B2
(45) Date of Patent: *May 6, 2008

(54) IMAGING DEVICE

(75) Inventor: Hirokazu Kuba, Tokyo (JP)

(73) Assignee: Olympus Corporation, Tokyo (JP)

( * ) Notice: Subject to any disclaimer, the term of this patent is extended or adjusted under 35 U.S.C. 154(b) by 654 days.

This patent is subject to a terminal disclaimer.

(21) Appl. No.: 10/924,099

(22) Filed: Aug. 23, 2004

(65) Prior Publication Data

US 2005/0018052 A1 Jan. 27, 2005

Related U.S. Application Data

(63) Continuation of application No. 10/198,422, filed on Jul. 18, 2002, now Pat. No. 6,856,815, which is a continuation of application No. 09/457,993, filed on Dec. 9, 1999, now Pat. No. 6,449,495.

(30) Foreign Application Priority Data

Dec. 10, 1998 (JP) .................................. 10-351684

(51) Int. Cl.
H04B 1/38 (2006.01)
H04M 1/00 (2006.01)

(52) U.S. Cl. .................. 455/557; 455/556.1; 455/90.2; 455/552.1; 455/559; 348/207.99; 348/207.1; 348/552; 348/E7.079; 348/E7.082; 348/375

(58) Field of Classification Search ......... 455/556.1–2, 455/557, 90.1–3, 3.01, 3.05–6, 558–559, 455/550.1, 552.1, 554.2; 348/207.99, 207.1, 348/11, 211.1–14, 231.1–9, 552, 373–376, 348/207.2, 14.01–4, E7.078, E7.079, E7.081, 348/E7.082

See application file for complete search history.

(56) References Cited

U.S. PATENT DOCUMENTS

| 6,111,604 | A  | * | 8/2000 | Hashimoto et al. | ....... 348/220.1 |
| 6,278,481 | B1 | * | 8/2001 | Schmidt | ...................... 348/64 |
| 6,278,884 | B1 | * | 8/2001 | Kim | ........................ 455/556.1 |
| 6,449,495 | B1 | * | 9/2002 | Kuba | ......................... 455/557 |
| 6,856,815 | B2 | * | 2/2005 | Kuba | ......................... 455/557 |

* cited by examiner

Primary Examiner—Tuan A. Tran
(74) Attorney, Agent, or Firm—Straub and Pokotylo; John C. Pokotylo

(57) ABSTRACT

When sending photographic image data obtained in an electronic camera 1 via a communication interface 42 to a radio telephone line of a PDC 3, a PHS 4, etc., an RISC-CPU 11 converts the image data to data having a configuration allowing communication and further converts by software processing the communication-allowing configuration data to data corresponding to the type of the radio telephone line.

10 Claims, 8 Drawing Sheets

IMAGING DEVICE

RELATED APPLICATIONS

This patent application is a continuation of U.S. patent application Ser. No. 10/198,422, filed on Jul. 18, 2002, now U.S. Pat. No. 6,856,815 which is a continuation of U.S. patent application Ser. No. 09/457,993, filed on Dec. 9, 1999 which issued as U.S. Pat. No. 6,449,495 on Sep. 10, 2002. Both of the foregoing applications are incorporated herein by reference.

BACKGROUND OF THE INVENTION

The present invention relates to imaging devices and, more particularly, to imaging devices capable of transmitting and receiving image data through a telephone line.

Recently, techniques of transmitting and receiving digital data through such transmission route as a telephone line are well known in the art. Also, it has been a recent trend for establishing techniques for transmitting and receiving photographic image data obtained with an electronic camera through such a telephone line. Such data communication is mostly realized by connecting a modem or like adaptor to the electronic camera and connecting the camera via the adaptor to the telephone line.

In the meantime, it has also been a recent trend for extensively using radio portable telephone sets such as so-called digital portable telephone sets (hereinafter referred to as PDCs) and PHSs. These telephone sets are all radio sets with their portability as a great feature. In view of recent electronic cameras which are mostly used as portable sets, the radio telephone lines constitute an optimum image data transmission route.

An example of the construction of a prior art image transmitting system for sending the data of an electronic camera to a radio portable telephone set will now be briefly described.

FIG. 7 shows such an image transmission system, in which a PDC 103 is connected via a PC card 102 to an electronic camera 101.

As shown in the Figure, the PC card 102 includes a communication interface 122, which is constructed as hardware and includes a digital error correction circuit 122a, high speed synchronous serials RX and TX, low speed asynchronous serials RX and TX, a function of processing transmission and reception signals and a predetermined interface (I/F). The PC card 102 also includes a CISC-CPU 121 for controlling the communication interface 122. The PC card 102 is connected by a PC card header 113 to the electronic camera 101, and it further includes a connector 123 to which the PDC 103 is connected.

The electronic camera 101 includes a RISC-CPU 111 having the role of controlling the entire system, and a connector interface 111 for connection to the PC card 102.

In the prior art image transmission system having the above construction, only a particular type of radio telephone set can be connected. Up to date, PDCs and PHSs are well known in the art as different types of radio telephone sets. These different types of telephone sets, however, can not be used commonly as digital data transmitting means. That is, the individual types of telephone sets are used with PC cards having different digital error correction circuits, and it is thus necessary to change the PC card to be used in dependence on the type of radio telephone set that is connected.

In the meantime, such a PC card can serve as an adaptor peculiar or exclusive to the connected telephone set, so that it may have a sole exclusive digital error correction circuit. The circuit is thus realized not as software but as hardware.

Concerning the electronic camera, a recently proposed one includes a communication interface having high speed synchronous serials RX and TX, low speed asynchronous serials RX and TX and a function of processing transmission and reception control signals.

FIG. 8 is a view showing an image transmission system using such an electronic camera, in which a PDC 203 is connected via a PC card 202 to the electronic camera 201.

As shown, the electronic camera 201 includes a communication interface 212 having high speed synchronous serials RX and TX, low speed synchronous serials RX and TX and a function of processing transmission and reception signals. The electronic camera 201 also includes an RISC-CPU 211 for controlling the communication interface 212.

The PC card 202 is connected by a PC card header 213 to the electronic camera 201, and includes a connector 224 to which the PDC 203 is connected. The PC card 202 further includes an interface 222 connected to the communication interface 212 of the electronic camera 201, a data processor IC 223 (i.e., digital error correction circuit constructed as hardware) for the PDC and CISC-CPU 221 for controlling the interface 222 and the IC 223.

Again in the image transmission system having the above construction, like the image transmission system as shown in FIG. 7, only a particular type of radio telephone set can be connected. That is, it is necessary to change the PC card to be used in dependence on the type of telephone set that is connected.

In the meantime, the PC card 202 can serve as an adaptor peculiar or exclusive to the type of the connected telephone set, so that it may have a sole exclusive digital error correction circuit. The circuit is thus realized not as software but as hardware.

While the image data transmitting and receiving system utilizing radio telephone line is convenient as described above, the PDC and the PHS are based on quite different data transmitting systems, and common property is lacking with respect to modems connected to the line. In addition, in view of the digital data transmitting system, the above radio telephone lines are different from the usual wired telephone line, and hence from modems connected thereto.

The electronic camera user thus has to prepare an adaptor corresponding to the type of telephone line (i.e., either wired or radio, or portable telephone set or PHS) that is utilized. Likewise, each communication carrier (i.e., PDC, PHS, etc.) requires an exclusive adopter (i.e, PC card). The PC card, although recently being on a reducing size trend, extremely spoils the portability of a portable camera when mounted on the body thereof. In addition, it is necessary to prepare an expensive exclusive PC card for each type of communication carrier, which is extremely uneconomical.

SUMMARY OF THE INVENTION

The invention was made in view of these problems, and it has an object of providing an imaging device capable of reliable transmission and reception of image data irrespective of the type of telephone line that is utilized.

According to a first aspect of the present invention, there is provided an imaging device comprising: a discriminating means for discriminating type of a radio telephone line connected to the device; a first converting means for converting photographic or recorded image data of a scene to communication data; and a second converting means for converting, at the time of image data transmission, the communication data in correspondence to the discriminated type of radio telephone line and converting, at the time of image data reception, received data to communication data capable of being recognized by the device in correspondence to the type of radio telephone line.

The second converting means includes a memory means with a plurality of stored error correction programs corresponding to respective different radio telephone lines, the error correction programs contributing to the correction of the digital values of communication data obtained in the first converting means.

The second converting means further includes a means for selecting a specified error correction program corresponding to the discriminated type of radio telephone line from the memory means.

The discriminating means discriminates a telephone line connected to the device to be a radio telephone line or a wired telephone line, and outputs, when the connected telephone line is discriminated to be a radio telephone line, the type of the connected radio telephone line.

The imaging device further comprises: a serial interface functioning as part of the communication interface when a connected telephone line is discriminated to be a radio telephone line and functioning as a wired telephone line interface when the connected telephone is discriminated to be a wired telephone line; and a switching means for switching the serial interface according to the output of the discriminating means.

According to a second aspect of the present invention, there is provided an imaging device comprising: an electronic imaging means for converting a scene image to an image signal; an image processing means for converting the image signal obtained in the electronic imaging means to image data; a communication processing means for converting the image data obtained in the image processing means to data having a configuration allowing communication; and a memory means with data conversion programs stored therein for being used to convert, at the time of data transmission, the communication-allowing configuration data obtained in the communication processing means to data conforming to the type of a pertinent telephone line and also convert, at the time of data reception, data different in dependence on the type of the telephone line to data having a configuration conforming to the communication processing means.

The memory means stores a plurality of different data conversion programs corresponding to respective different types of telephone lines, and the imaging device includes: a connecting means for connecting the device to a telephone line; a discriminating means for discriminating the type of a telephone line connected thereto via the connecting means; and a selecting means for selecting a particular data conversion program among the plurality of data conversion programs stored in the memory means in correspondence to the discrimination result in the discriminating means.

The data conversion programs are error correction programs.

The imaging device further comprises: a line connecting means for connecting a telephone line to the device; an external device connecting means for connecting an external device to the device; a checking means for checking the connecting states of the telephone line connecting means and the external device connecting means; a serial interface for permitting data communication via the telephone line or data communication with the external device; and a switching means for switchedly connecting the telephone line connecting means and the external device connecting means to the serial interface according to the result of checking in the checking means.

Other objects and features will be clarified from the following description with reference to attached drawings.

PREFERRED EMBODIMENTS OF THE INVENTION

Preferred embodiments of the present invention will now be described with reference to the drawings.

Figure 1:
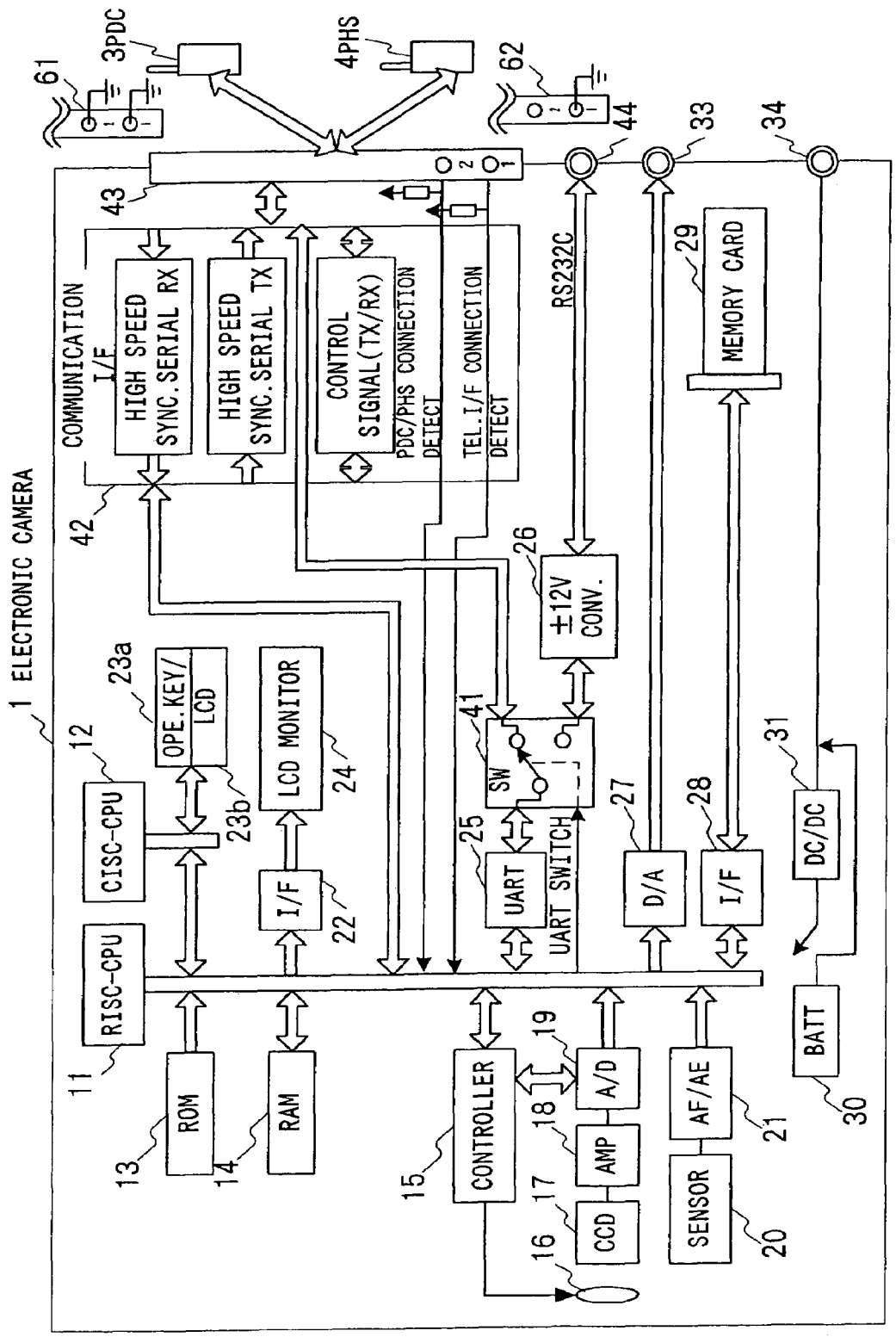
FIG. 1 is a block diagram showing the construction of an electronic camera in an embodiment of the invention.

FIG. 1 is a block diagram showing the construction of an electronic camera in an embodiment of the invention. Features of the electronic camera embodying the invention will now be briefly described.

The electronic camera 1 as shown in FIG. 1 has a communication function of transmitting and receiving the data to and from a personal computer or a wired telephone line or a radio telephone line (i.e., so-called portable telephone set (PDC) 3 or PHS 4). Specifically, the electronic camera 1 has serial connectors 43 and 44. The serial connector 43 can be connected to radio telephone lines of the PDC 3, the PHS 4, etc. for transmitting and receiving digital data via these radio telephone lines. The serial connector 44 can be connected to a personal computer, wired telephone line modem (see FIG. 2), etc. for transmitting and receiving digital data to and from the personal computer and so forth. The connection of the serial connector 43 to the PDC 3 or the PHS 4 and the connection of the serial connector 44 to the personal computer, etc. are made by using respective predetermined cables as will be described later in details.

The construction of the electronic camera 1 having the above features will now be described.

The electronic camera 1 comprises a lens 16, a CCD 17, an amplifier 18, an A/D converter 19, a lens controller 15 and a RAM 14 as means for a scene image into an image signal under control of an RISC-CPU 11 and image processing means for converting the image signal thus obtained to image data.

The electronic camera 1 further comprises a sensor 20 for light intensity measurement and distance measurement, a controller (i.e., AF/AE circuit) 21, a liquid crystal monitor 24 for displaying photographic or recorded image, a monitor interface 22, an operation key set 23a for causing predetermined operations of the electronic camera 1, an LCD 23b for displaying various items, a CISC-CPU 12 for controlling the operation key set 23a, the LCD 23b and other circuits requiring processing at relatively low rates, a D/A converter 27 for outputting a video signal to an external display, a video signal output terminal 33, a memory card removably mounted for storing photographic data obtained with the electronic camera 1, a memory card interface 28, a battery 30 as a power supply for the electronic camera 1, an external power supply terminal 34 for using an external power supply and a DC/DC converter 31. These components are well known in the art and the same as those provided in ordinary electronic cameras, and they are not described in details.

In the electronic camera 1, the RISC-CPU 11 controls communication processing, which converts the image data obtained as a result of conversion in the image processing means to the data having a configuration allowing communication, according to predetermined data stored in the ROM 13. In the ROM 13 are also stored programs concerning various controls of the camera. In the ROM 13 are further stored digital error correction programs corresponding to different types of radio telephone lines (such as those of the PDC 3, the PHS 4, etc.).

The electronic camera 1 still further comprises an UART (i.e., serial interface) 25 for transmitting and receiving the image data or like digital data to and from an external unit, such as a personal computer or a wired telephone line, a communication interface 42 for transmitting the digital data to radio telephone lines of the PDC 3, the PHS 4, etc., an UART switch 41 for switching the UART 25, a ±12-V converter 26 for communication with a personal computer, etc., a serial connector 43, which is a 16-pin connector to be connected to a radio telephone like, and a serial connector 44, which is a 9-pin connector to be connected to a personal computer, etc.

The communication interface 42 is provided for transmitting and receiving data to and from a radio telephone line of the PDC 3, the PHS 4, etc. under control of the RISC-CPU 11, and it has high speed synchronous serials RX and TX and a function of processing transmission and reception control signals. The communication interface 42 also has functions of detecting the type of carrier (i.e., the PDC (PCD) 3 or the PHS 4) connected to the serial connector 4.3 and sending out the detection result of the carrier type (i.e., PCD or PHS) to the RISC-CPU 11.

In the embodiment of the electronic camera 1, the processing of signals of low speed asynchronous serials RX and TX is undertaken not by the communication interface 42 but by the UART 25. More specifically, when a carrier (i.e., a radio telephone set) is connected to the serial connector 43, it is detected by the serial connector 43 and the communication interface 42, and the UART switch 41 is switched to connect the UART 25 to the communication interface 42 under control of the RISC-CPU 11, which receives the detection result. The UART 25 thus provides the function of low speed asynchronous signal processing, while the communication interface 42 provides the function of high speed synchronous signal processing. In other words, the communication interface 42 and the UART 25 share the function of the data communication interface. This arrangement permits reducing the size and cost of the communication interface 42.

As described above, when a carrier (i.e., the PDC 3 or the PHS 4) is connected to the serial connector 43, the UART 25 functions as part of the communication interface. Without any carrier connected to he serial connector 43, however, the UART 25 serves as an ordinary UART for a personal computer or a wired telephone line. Specifically, when a personal computer 5 or a modem 6 (for wired telephone line) is connected to the serial connector 44 without any carrier connected to the serial connector 43, the UART switch 42 is switched to connect the UART 25 to the serial connector 44 under control of the RISC-CPU 11.

As described above, digital error correction programs are stored in the ROM 13 to be controlled by the RISC-CPU 11. As the digital error correction programs, those corresponding to all the different types of carriers (i.e., PDC 3, PHS 4, etc.) which can be connected to the serial connector 43 are prepared. Thus, data conversion corresponding to the type of radio telephone line (i.e., carrier) connected to the serial connector 43 is realized as a software process.

In the ROM 13 are also stored processing data concerning usual camera controls as well as the recording and reproduction of JPEG data. In this embodiment, the above digital error correction programs are stored in addition to these data. Thus, the digital error correcting function which is normally provided by hardware, can be efficiently executed as software processing.

While in this embodiment the processing of the signals of the low speed asynchronous serials RX and TX are left to the UART 25, this is by no means limitative, and it is possible to left the communication interface 42 be in charge of this processing as-well.

Usually, the PDC 3 or the like has sole digital interface for the voice. That is, a predetermined process is necessary for transmitting the image data. In this embodiment of the electronic camera 1, such a process program is also stored in the ROM 13, thus providing a software processing function.

The serial connector 43 has the role of a radio telephone set connector, to which the PDC 3 and the PHS 4 can be connected, and which has a function of detecting type of connected radio telephone set, such as the PDC 3 or the PHS 4.

In this embodiment, the type of carrier (i.e., radio telephone line) connected to the serial connector 43 can be discriminated by discriminating the type of the carrier side connector connected to the serial connector 43. More specifically, a cable with a PDC connector 61 is provided for connecting the PDC 3, and a cable with a PHS connector 62 is provided for connecting the PHS 4. The cables are selectively used in dependence on the type of radio telephone set used, thus permitting the discrimination of the type of line.

Specifically, different ground pins are provided for the connectors 61 and 62, thus permitting electric discrimination. In addition, a common ground pin is provided for the connectors 61 and 62 to permit a check as to whether any carrier is connected to the serial connector 43.

The function of communication between the electronic camera 1 and either a personal computer or a wired telephone line will now be briefly described.

Figure 2:
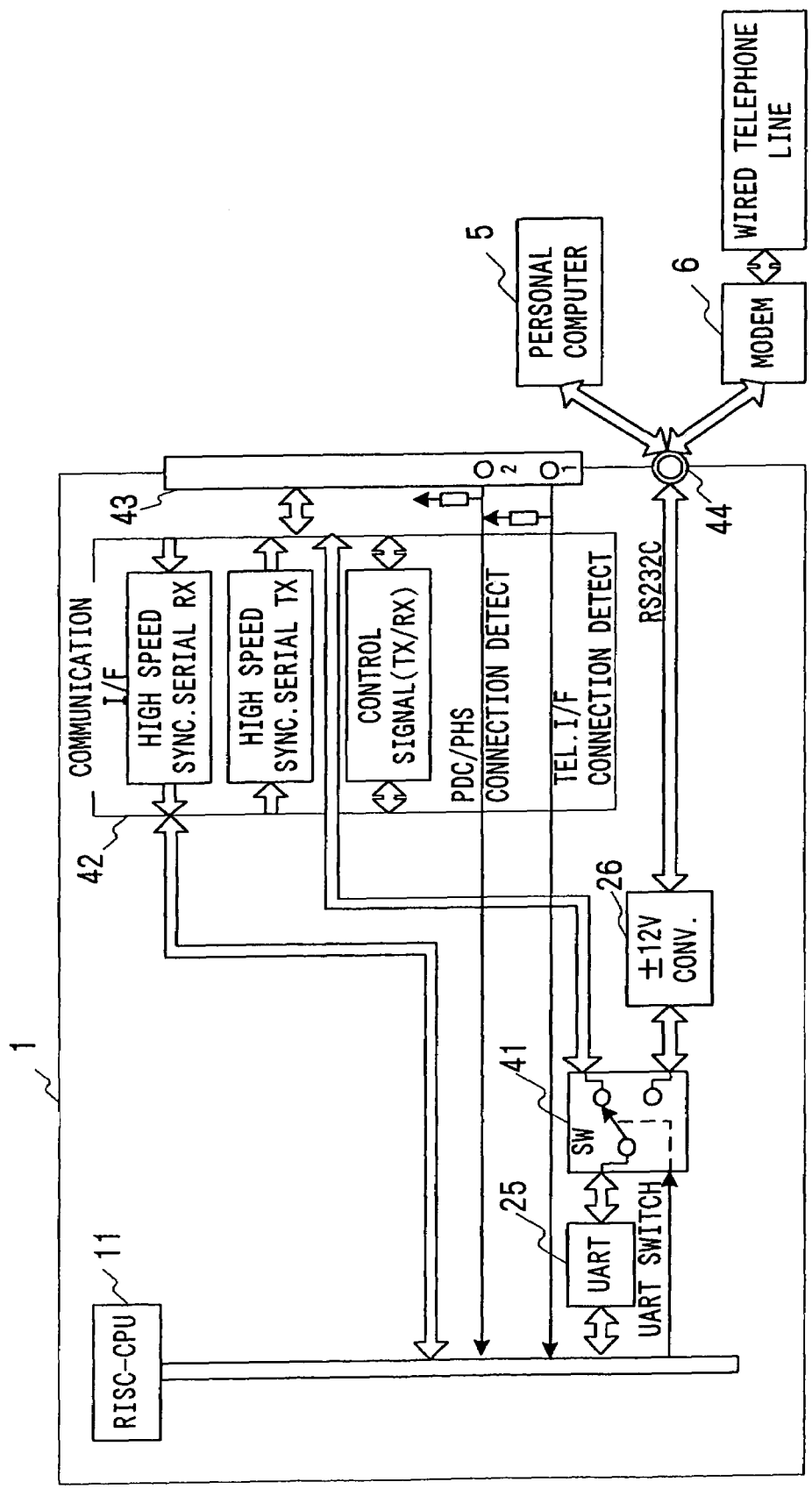
FIG. 2 is a view showing the construction in the case when a personal computer or a usual wired telephone line to the embodiment of the electronic camera.

As shown in FIG. 2, by connecting the personal computer 5 to the serial connector 44, it is possible to transmit photographic or recorded digital image data. Alternatively, by connecting the modem 6 having the normal function, it is possible to obtain digital data communication between the electronic camera 1 and the wired telephone line via the modem 6.

While the embodiment of the electronic camera 1 has a communication function utilizing a wired telephone line, the communication is allowed to proceed according to data stored in the ROM 13 under control of the RISC-CPU 11. Specifically, it is assumed that the modem 6 is connected to the serial connector 44 for connection thereof to a usual wired telephone line and a communication state is brought about by the operation key set 23*a* or the like. Under this condition, the RISC-CPU 11 executes various processes such as the setting of a predetermined communication modem negotiation with destination of the communication and protocol switching for data transfer according to the data stored in the ROM 13. The RISC-CPU 11 further executes data compression and other controls. These communication procedures are well known in the art, and are not described here.

Figure 3:
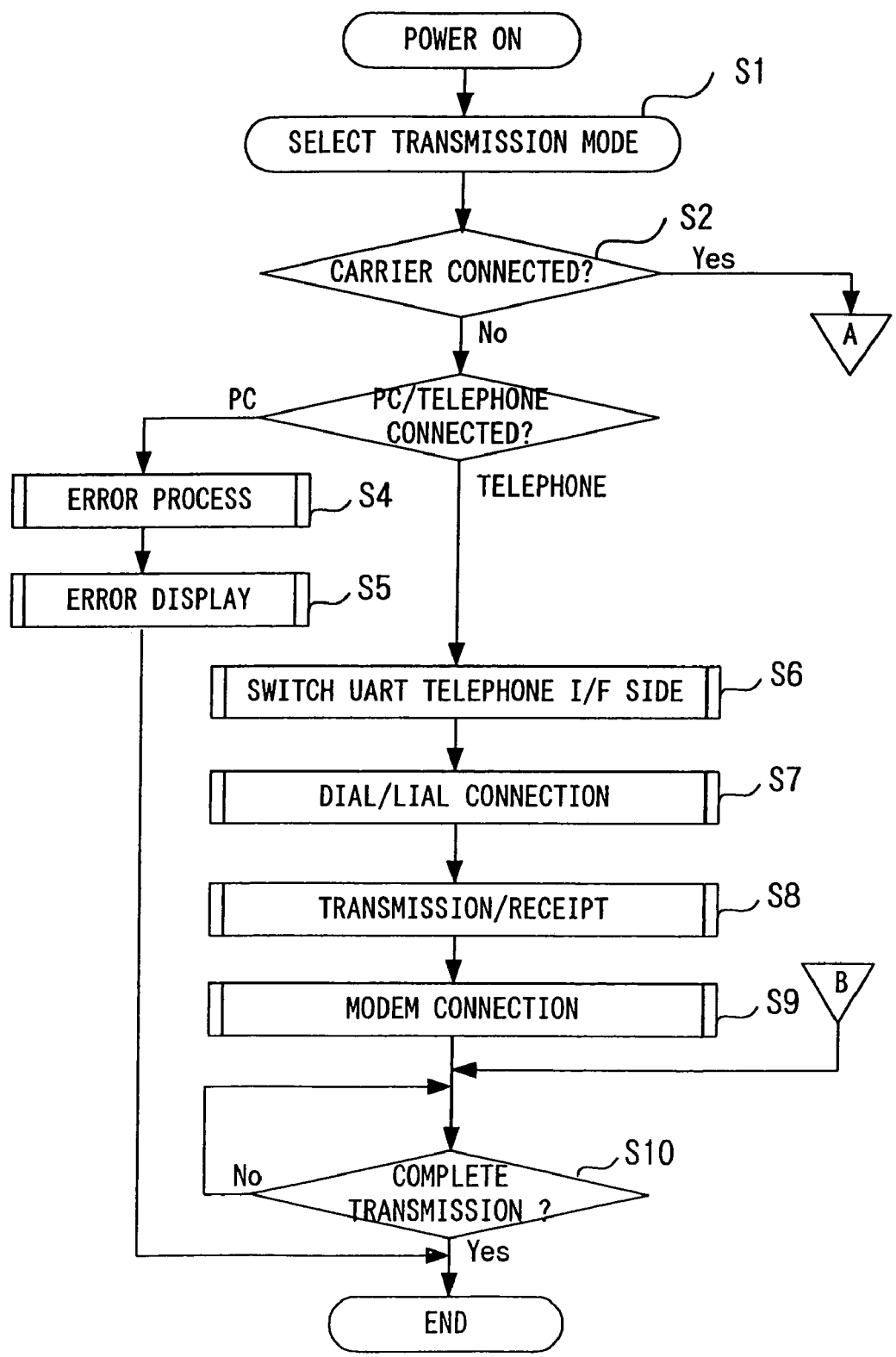
FIG. 3 is a flow chart illustrating operations of communication of photographic or recorded image data in the embodiment of the electronic camera by utilizing a usual wired telephone line or a radio telephone line of a PDC, a PHS, etc.
Figure 4:
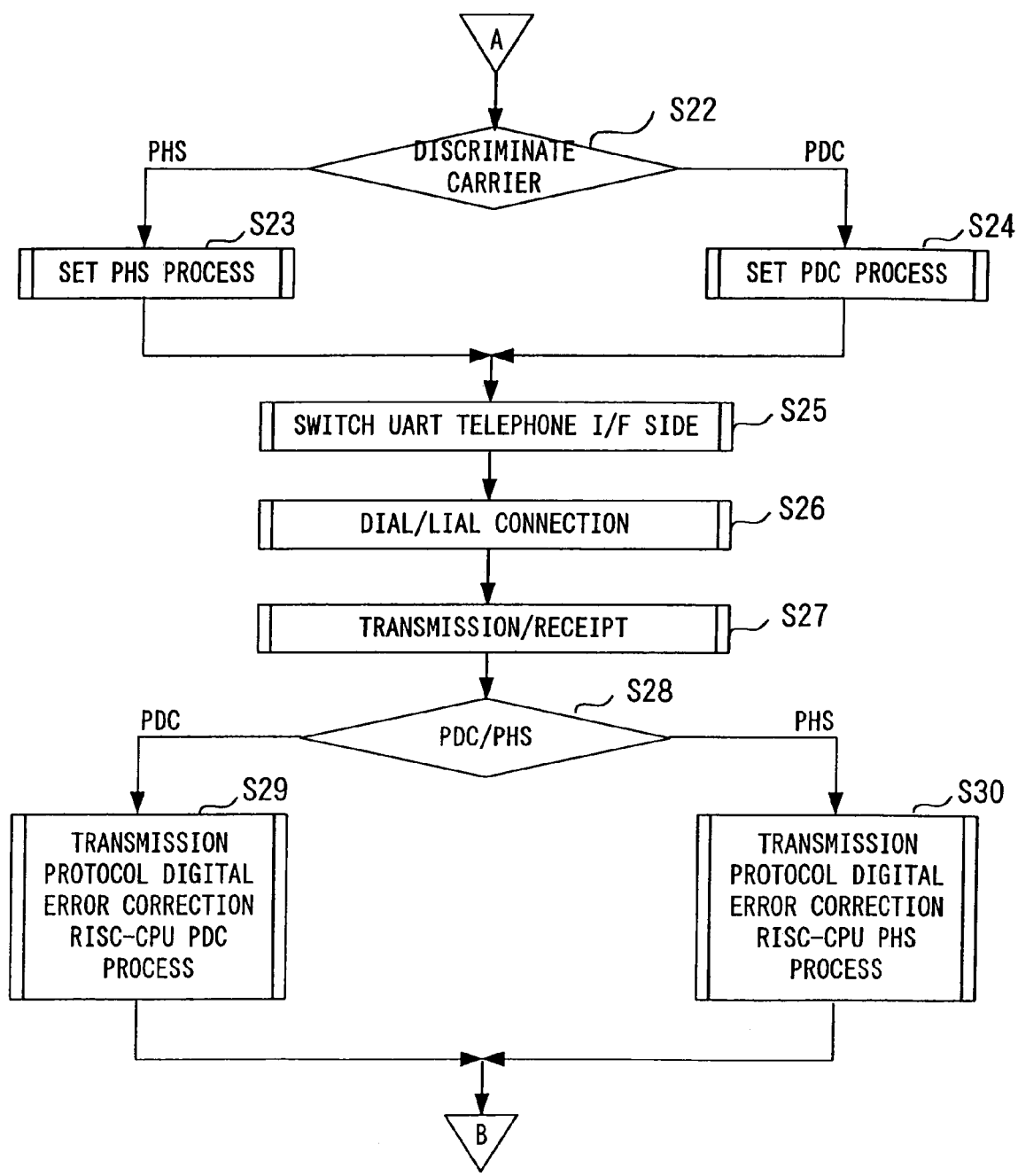
FIG. 4 is a flow chart illustrating operations of communication of photographic or recorded image data in the embodiment of the electronic camera by utilizing a usual wired telephone line or a radio telephone line of a PDC, a PHS, etc.

Operations concerning the communication of the embodiment of the imaging system having the above construction will now be described with reference to the flow chart of FIGS. 3 to 5. FIGS. 3 and 4 are flow charts illustrating operations in the communication of photographic or recorded image data of the electronic camera 1 by utilizing the usual radio telephone line and a radio telephone lines such as those of the PDC 3, the PHS 4, etc. The operations are shown as a control routine executed by the RISC-CPU 11.

Figure 5:
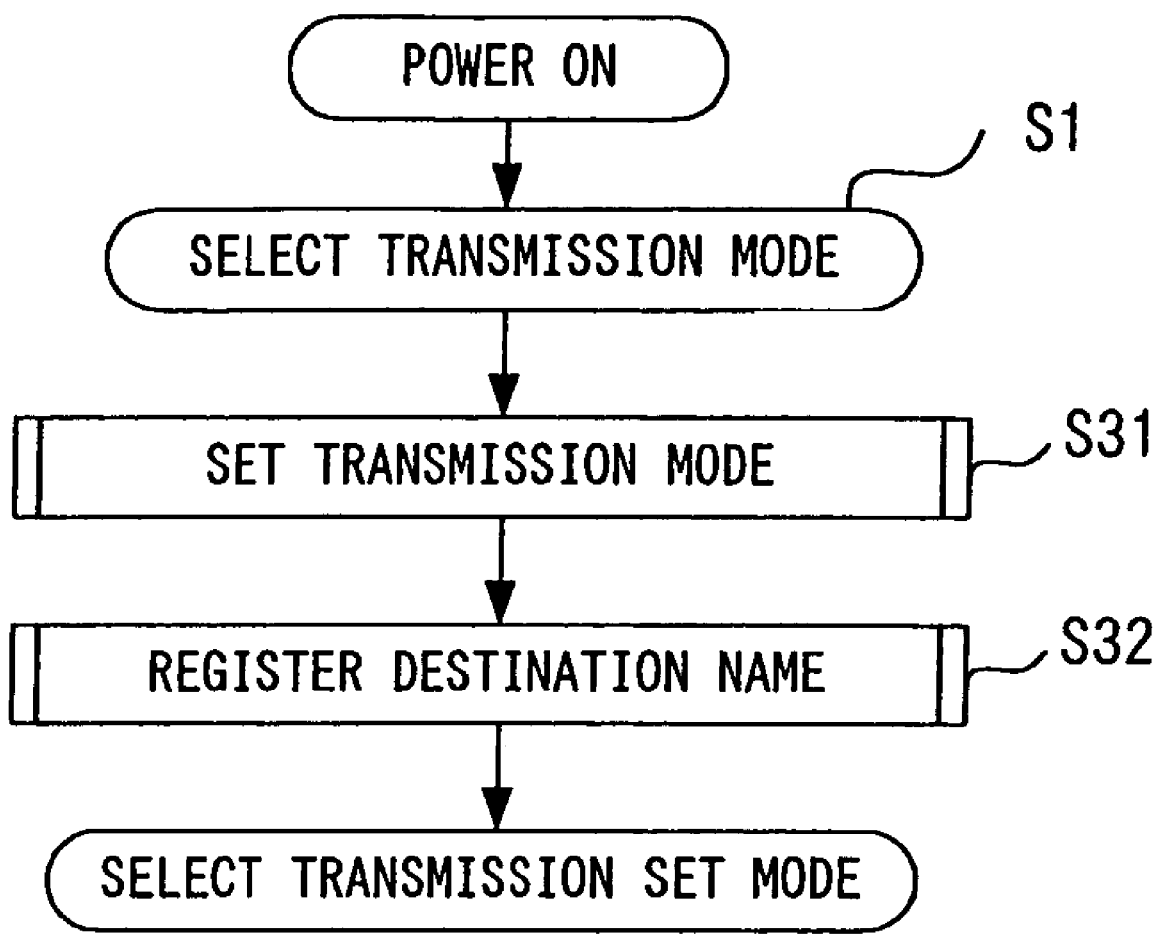
FIG. 5 is a flow chart showing the transmission mode setting operation in the embodiment.

As shown in FIG. 3, when the user selects an image data transmission mode by operating the operation key set 23*a* in the "on" state of the power supply of the electronic camera 1 (step S1), the RISC-CPU 11 controls circuitry pertinent to various settings concerning the transmission mode as shown in FIG. 5. The user can set an "independent transmission" mode, an "auto transmission" mode, an "auto reception" mode, etc. for image data transmission with the operation key set 23*a*, the LCD 23*b*, etc (step S31). The user can also register the name of destination, telephone number, type of telephone line, etc. (step S32).

Referring back to FIG. 3, after the various transmission mode setting operations, the RISC-CPU 11 of the electronic camera 1 checks whether any carrier, such as the PDC 3, the PHS 4, etc., has been connected to the serial connector 43 (step S2). In this check, the PDC 3 or the PHS 4 is electrically detected as such when the corresponding one of the connectors 61 and 62 is connected to the serial connector 43.

When it is detected in the step S2 that a certain carrier is connected, the RISC-CPU 11 executes step S22 (FIG. 4) of discriminating the type of the connected carrier. In this check, the connector connected to the serial connector 43 can be electrically discriminated to be the connector 61 of the PDC 3 or the connector 62 of the PHS 4.

In dependence on the type of carrier connected to the serial connector 43 as discriminated in the step S22, the RISC-CPU 11 executes either step S23 or S24, and then executes step S25. In the step S25, the RISC-CPU 11 switches the UART 25 according to the result of the carrier discrimination. Then, the RISC-CUP 11 executes dialing and line connection (step S26) and a data transmitting/receiving process (step S27) in a sequence as stored in the ROM 13.

Subsequently, the RISC-CPU 11 discriminates the type of the connected carrier once again (step S28), and then executes either step S29 or S30 with the transfer protocol, digital error correction and line type corresponding to the discriminated carrier type. Referring back to FIG. 3, when data transmission has been completed (step S10), an end is brought to the routine.

When it is found in the step S2 that no carrier (i.e., radio telephone set) is connected to the serial connector 43, the RISC-CPU 11 checks whether any personal computer or the like is connected to the serial connector 44 and also checks whether the connected carrier, if any, is a personal computer or the wired telephone line via a modem (step S3).

When it is found in the step S3 that a personal computer is connected, no communication on telephone line is made, and the RISC-CPU 11 executes steps S4 and S5 of predetermined processes of error detection and error display, respectively, thus bringing an end to the routine.

When it is found in the step S3 that a modem is connected, the RISC-CPU 11 switches the UART 25 (step S36), executes dialing and line connection (step S27), and executes a data transmitting/receiving process (step S8). The RISC-CPU 11 then executes a predetermined process of modem connection (step S9), and then completes the data transmission (step S10), thus bringing an end to the routine.

A routine of photographic image recording in the electronic camera 1 will now be briefly described with reference to the flow chart of FIG. 6.

Figure 6:
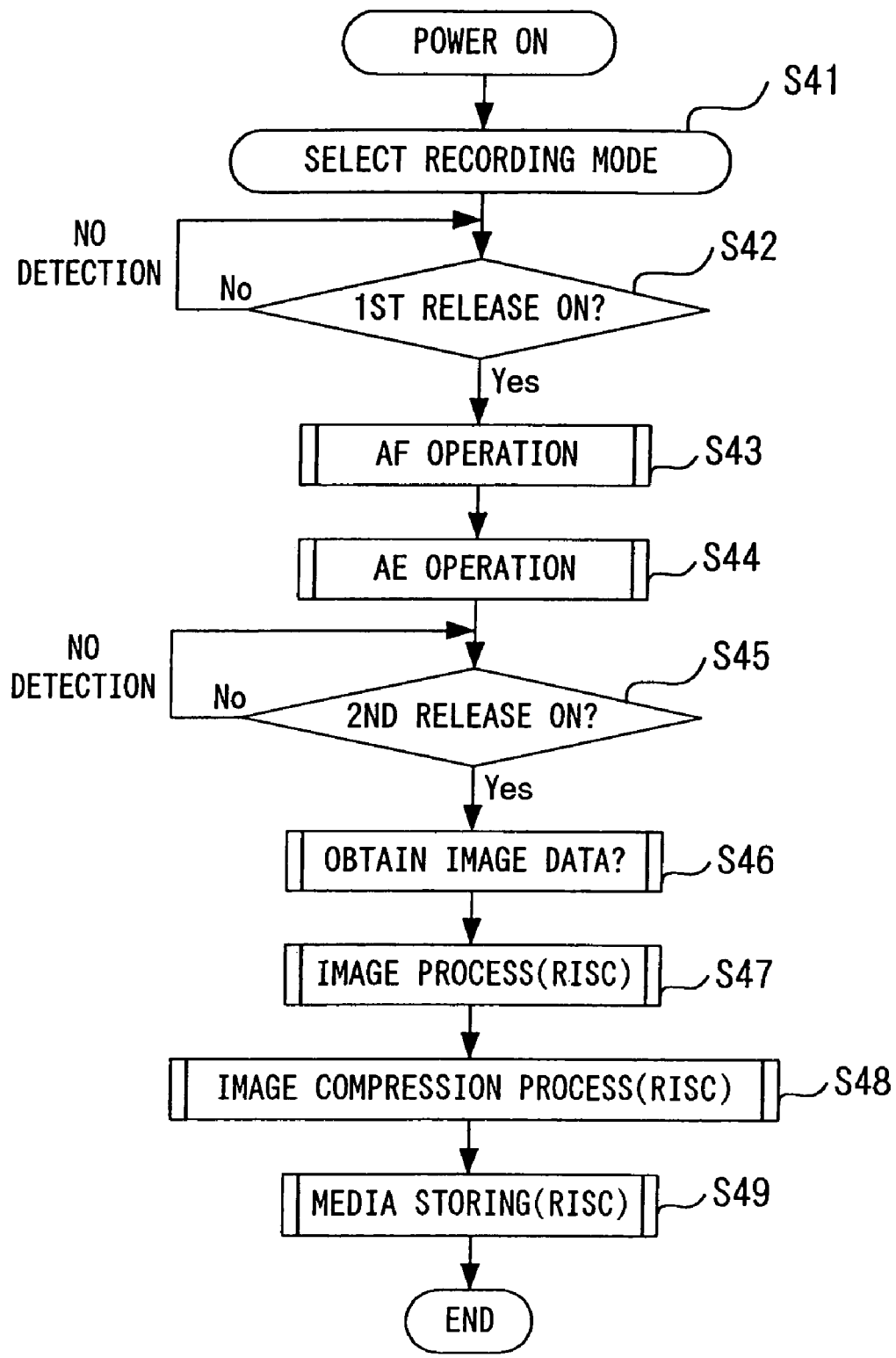
FIG. 6 is a flow chart showing a routine of photographic image recording in the electronic camera.
Figure 7:
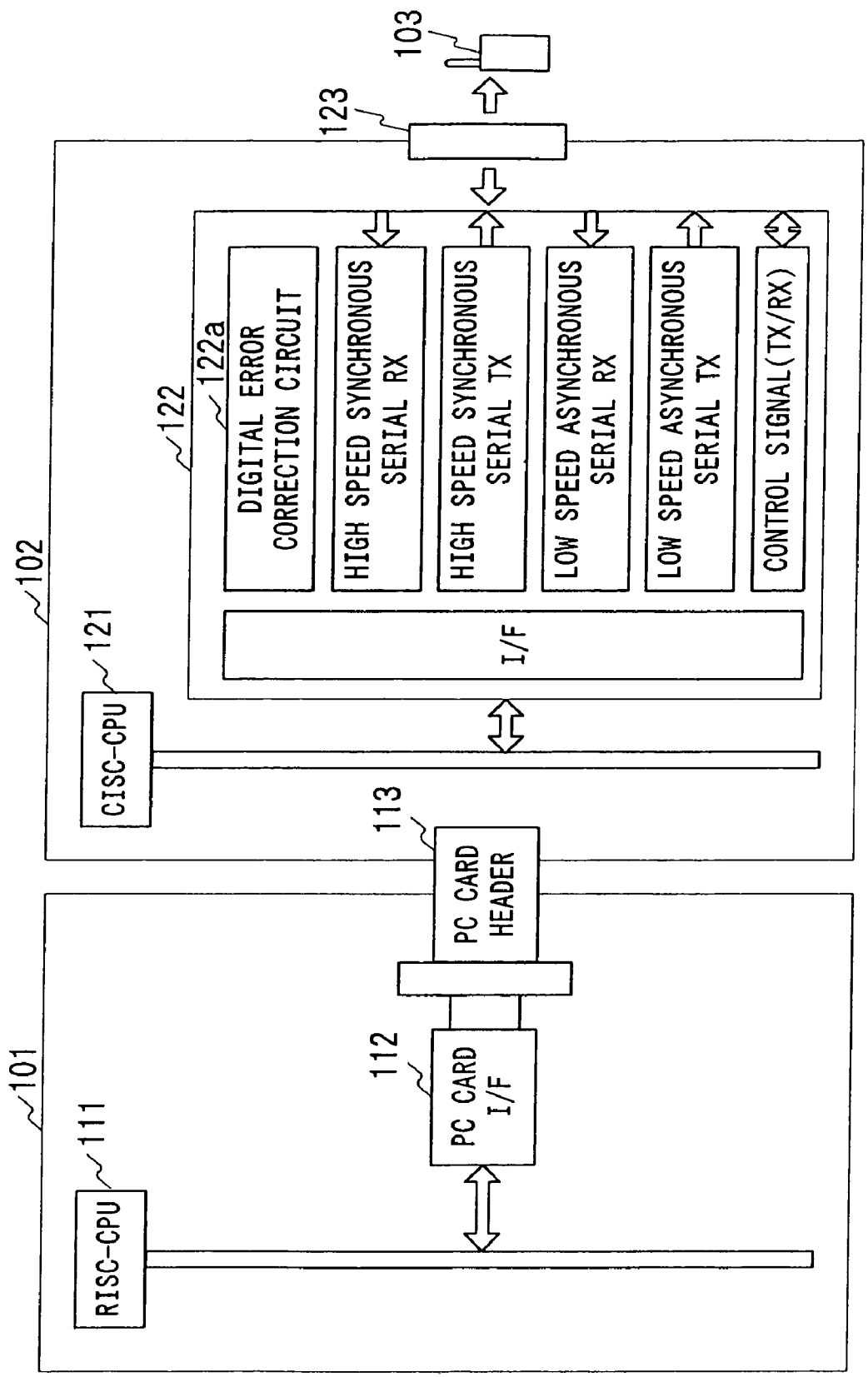
FIG. 7 is an example of the construction of a prior art image transmitting system for sending the data of an electronic camera to a radio portable telephone set.
Figure 8:
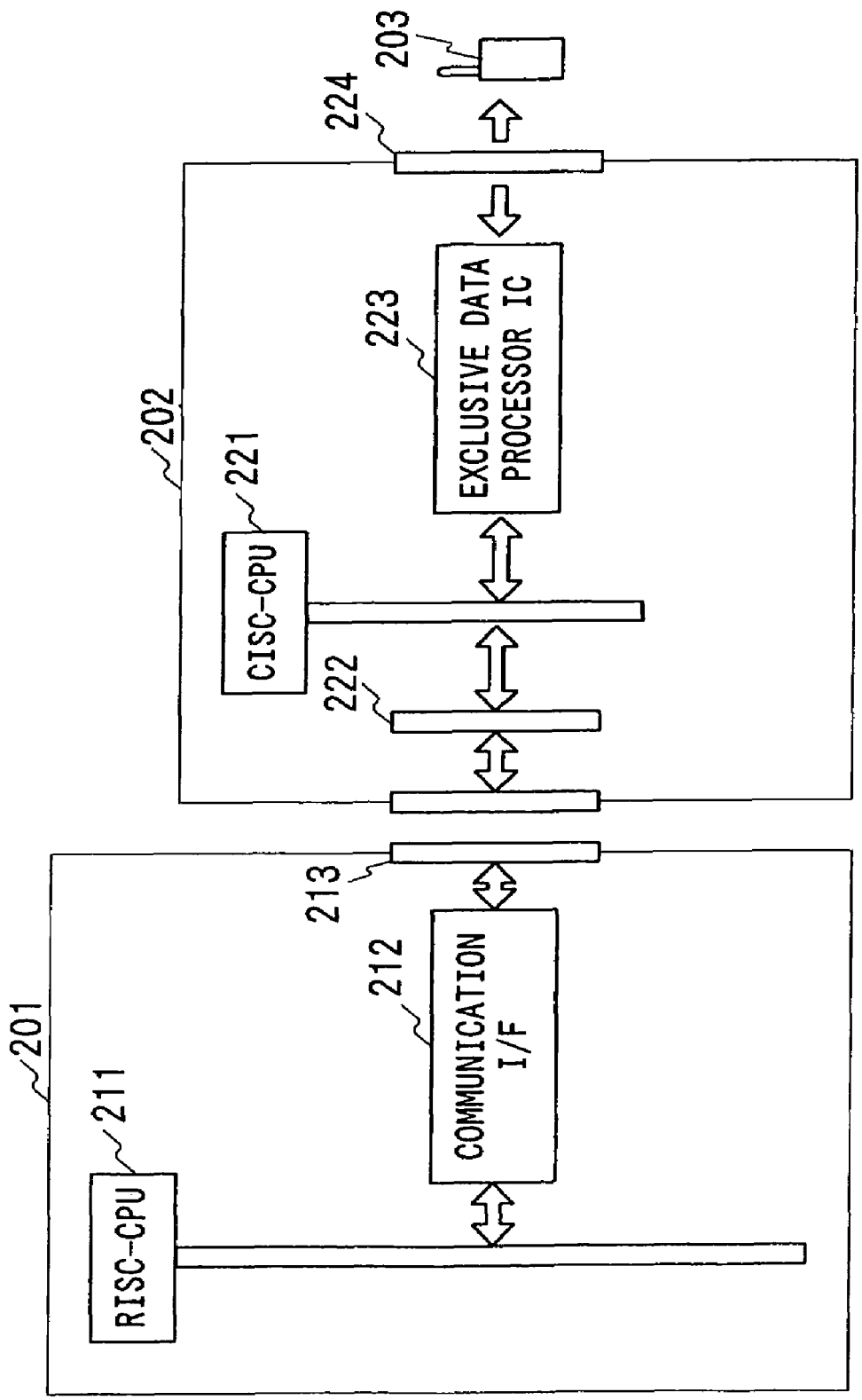
FIG. 8 is a view showing a prior art image transmission system in which a PDC is connected via a PC card to an electronic camera.

Referring to FIG. 6, when the user selects a recording mode with the operation key set 23*a* in the "on" state of the power supply of the electronic camera 1 (step S41), the RISC-CPU 11 waits for turning-on of a first release switch (not shown) (step S42). When the first release switch is turned on, the RISC-CPU 11 executes auto focusing and auto exposure by controlling the light intensity/distance measurement sensor 20 and the AF/AE circuit 21 (steps S43 and S44).

Subsequently, the RISC-CPU 11 waits for turning-on of a second release switch (not shown) (step S45). When the second release switch is turned on, the RISC-CPU 11 controls picking-up of a scene image in the CCD 17, conversion of the image signal thus obtained to image data and storing thereof in the RAM 14. (step S46). Then, the RISC-CPU 11 appropriately executes an image processing and an image compression processing (steps S47 and S48), and then causes storing of image data thus obtained in the memory card 29 (step S49).

As has been shown, with the embodiment of the imaging system it is possible to provide an imaging device capable of sending the digital data of an electronic camera on a radio telephone line by merely discriminating the type of the carrier side connector connected to the serial connector 43, and does not require preparation of expensive and large size PC cards or the like for different types of radio telephone lines, so that it is economical as well as being excellent in mobility.

While in the embodiment the type of a radio telephone line (of either PDC 3 or PHS 4) connected to the serial connector 43 is automatically (i.e., electrically) discriminated from the corresponding one of the carrier side connectors 61 and 62 connected to the serial connector 43, this is by no means limitative, and it is also possible to permit manual switching.

As has been described in the foregoing, according to the invention it is possible to provide an imaging device capable of reliable transmitting and receiving image data irrespective of the type of telephone line that is utilized.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An imaging device including:
   a) a connector component adapted to handle communications with a wireless communications link of a first type and a wireless communications link of a second type;
   b) a discrimination device adapted to determine a type of wireless communications link coupled with the imaging device; and
   c) a data converter adapted to convert image data using a determination of the discrimination device.

2. The image device of claim 1 wherein the connector component is a serial connector.

3. The image device of claim 1 wherein the wireless communications link of a first type is a first type of radio telephone link and the wireless communications link of the second type is a second type of radio telephone link.

4. The image device of claim 1 wherein the discrimination device includes at least one connector element of the connector component.

5. The image device of claim 1 wherein the discrimination device includes two connector elements of the connector component.

6. The image device of claim 1 wherein the data converter is adapted to use a selected one of a plurality of stored conversion programs to convert the image data.

7. The image device of claim 6 wherein each of the plurality of stored conversion programs is a different error correction program.

8. The image device of claim 1 wherein the data converter includes a memory device storing a plurality of stored conversion programs to convert image data, and a controller adapted to select one of the plurality of stored conversion programs using a determination of the discrimination device.

9. The image device of claim 8 wherein each of the plurality of stored conversion programs is a different error correction program.

10. The image device of claim 1 further comprising:
   d) a second connector component adapted to handle communications from a wired communications line, wherein the discrimination device is further adapted to determine whether a wired communications link is coupled with the imaging device, or a type of wireless communications link coupled with the imaging device;
   e) a switch adapted to enable communications either with one of the wireless communications links, or a wired communications link; and
   f) a controller adapted to control a state of the switch using a determination of the discrimination device.

* * * * *